US008180874B2

(12) United States Patent
Sun et al.

(10) Patent No.: US 8,180,874 B2
(45) Date of Patent: May 15, 2012

(54) FACILITATING DEFENSE AGAINST MAC TABLE OVERFLOW ATTACKS

(75) Inventors: Yong Sun, Kanata (CA); Vinod K. Choyi, Ottawa (CA)

(73) Assignee: Alcatel Lucent, Paris (FR)

( * ) Notice: Subject to any disclaimer, the term of this patent is extended or adjusted under 35 U.S.C. 154(b) by 963 days.

(21) Appl. No.: 12/008,535

(22) Filed: Jan. 11, 2008

(65) Prior Publication Data
US 2009/0182854 A1    Jul. 16, 2009

(51) Int. Cl.
*G06F 15/173*    (2006.01)
(52) U.S. Cl. ............ 709/223; 726/22; 726/26; 370/392; 370/229; 370/395.53
(58) Field of Classification Search .................. None
See application file for complete search history.

(56) References Cited

U.S. PATENT DOCUMENTS
2004/0062200 A1    4/2004    Kesavan
2007/0230469 A1    10/2007   Teshima

FOREIGN PATENT DOCUMENTS
EP    1648118    4/2006

OTHER PUBLICATIONS
International Search Report; International Publication No. WO 2009/093224 A3; dated Oct. 29, 2009, 4 pages.

*Primary Examiner* — Nasser Moazzami
*Assistant Examiner* — Fikremariam A Yalew

(57)    ABSTRACT

A method for defending against MAC table overflow attacks comprises a plurality of operations. An operation is performed for determining whether each one of a plurality of MAC addresses within a MAC table has one-way traffic or two-way traffic corresponding thereto. Thereafter, operations are performed for designating each MAC address having two-way traffic corresponding thereto as a first category of MAC address and for designating each MAC address having one-way traffic corresponding thereto as a second category of MAC address. In response to the number of the MAC addresses designated as the second category of MAC address exceeding a prescribed threshold value, an operation is performed for causing a timeout value of at least a portion of the MAC addresses designated as the second category of MAC address to be less than a timeout value of the MAC addresses designated as the first category of MAC address.

12 Claims, 4 Drawing Sheets

FACILITATING DEFENSE AGAINST MAC TABLE OVERFLOW ATTACKS

FIELD OF THE DISCLOSURE

The disclosures made herein relate generally to source address learning in MAC (Media Access Control) tables and, more particularly, to facilitating defense against MAC table overflow attacks through control of information within a MAC table.

BACKGROUND

An Ethernet switch (i.e., the switch) forwards Ethernet frames to a specific port depending on the physical destination address (i.e., MAC address) from the Ethernet frame. In order to do this, the switch must remember which port leads to a specific destination address. This information is stored in a MAC table that is populated (i.e., built) by means known as source learning. Source leaning includes the switch dynamically learning the MAC address of an Ethernet frame by checking the source address of a received Ethernet frame. If the MAC address for this Ethernet frame does not exist in the MAC table, a record is created associating this MAC address with the port on which the MAC address was learned.

Each dynamically learned entry has a time-to-live. In this manner, each entry in the MAC table will age out if an Ethernet frame designating that respective MAC address is not received by the switch for a configurable period of time. This configurable period of time is referred to as the timeout value. When the MAC table is full, no MAC address will be learned until some entry in the table ages out.

With respect to malicious acts associated with managing information within a MAC table, MAC table overflow attack is one of the major risks to Ethernet LAN and simulated Ethernet LAN service such as, for example, Virtual Private LAN Service (VPLS) over MPLS (Multi Protocol Label Switching). In a MAC table overflow attack, an attacker attempts to exploit source leaning of an MAC table of an Ethernet switch. Such exploitation includes subjecting the Ethernet switch with a large number of invalid source MAC addresses (i.e., flooding with invalid source MAC addresses) to fill up the MAC table with such invalid source MAC addresses. In doing so, traffic to and from unknown address will be flooded to all ports of the Ethernet switch causing network performance to degrade significantly and allowing the attacker to snoop the traffic. If the attacker maintains the flood of invalid source MAC addresses, eventually all the older legitimate MAC entries could age out, and all legitimate traffic would be flooded. From both a performance and a security perspective, problems associated with MAC address flooding become more serious when Ethernet is deployed across a metro or wide area network.

One known approach to defending against MAC address flooding is referred to as "Port Security". Port Security functions to prevent MAC table over-flow by allowing a network administrator to configure (e.g., statistically configure) the MAC addresses that are allowed for a particular port of an Ethernet switch. Frames that are originated from addresses other than the configured address(es) are dropped. However, a limitation of Port Security is that it is not suitably scalable because each MAC address needs to be configured manually on the Ethernet switch. As such, when a network becomes sufficiently large (e.g., a carrier network), it is often impossible to configure each and every MAC address manually.

An extension to Port Security is referred to as "Dynamical Port Security". Dynamical Port Security allows the administrator to specify the number of MAC addresses allowed for each port, as opposed to just being able to configure the MAC addresses themselves. When the specified number of MAC addresses is learned for the configured port, other source MAC address will not be allowed. In this manner, Dynamical Port Security resolves the problem of manual configuration of MAC address. But, Dynamical Port Security is not without its own limitations. For example, if an attacker launches MAC flooding attack in one port, it can cause a Denial of Service (DoS) attack to legitimate hosts connected to the same port when the MAC address limit allowance is reached. Moreover, Dynamical Port Security is limited in its flexibility. If new users are added to a port, the MAC address limit allowance on the switch has to be raised to accommodate more MAC addresses. For these reasons, Dynamical Port Security is not suitable for a service provider's network.

A standard referred to as MACSec (i.e., MAC Security as defined in EEEE 802.1ae) provides LAN security by using cryptographic techniques to protect data confidentiality and integrity in a LAN, and it also indirectly resolves the MAC flooding problem. But, MACSec is a heavyweight solution that requires support of switches and all end users to prevent a DoS attack. Accordingly, it may not work in an exiting network. Furthermore, MACSec is not practical to upgrade a required installation base of Ethernet to support this standard, and some mechanisms must be in place to deliver PKI (public key infrastructure) security keys either out of band or online before network communication can be initiated. Significant key management work must to be done to support the MACSec standard. As a result, to some users who are more concerned about the speed and service availability, like a VPLS service provider, a lightweight solution to MAC table overflow attack may be more desirable.

Therefore, a solution that defends against MAC table overflow attacks in a manner that overcomes limitations associated with known approaches for defending against MAC table overflow attacks would be advantageous, desirable and useful.

SUMMARY OF THE DISCLOSURE

Embodiments of the present invention are configured for defending against MAC table overflow attacks in a manner that overcomes limitations associated with known approaches for defending against MAC table overflow attacks. More specifically, embodiments of the present invention preclude a MAC table overflow attack from causing legitimate MAC entries in a MAC table from becoming aged out if an attacker maintains the flood of invalid source MAC addresses. In this manner, embodiments of the present invention prevent all legitimate traffic from being flooded at the expense of invalid source MAC addresses from the attacker.

Traditionally, a switch builds a MAC table by source learning (i.e., dynamic learning) and forward frames based on this table. Each of these dynamically learned entries has the same timeout value. Accordingly, when the switch is under attack, if older entries age out slower than newer entries are learned, eventually the MAC table of the switch will become filled to its capacity. As t opposed to assigning the same timeout value for every MAC address, a switch configured in accordance with an embodiment of the present invention assigns shorter timeout value to invalid MAC addresses than it does to legitimate ones. In doing so, when a MAC table overflow attack happens, invalid entries in the MAC table can age out faster and make room for legitimate ones, thus preventing the potential MAC table overflow attack.

In one embodiment of the present invention, a method for defending against MAC table overflow attacks comprises a plurality of operations. An operation is performed for determining whether each one of a plurality of MAC addresses within a MAC table has one-way traffic or two-way traffic corresponding thereto. Thereafter, operations are performed for designating each MAC address having two-way traffic corresponding thereto as a first category of MAC address and for designating each MAC address having one-way traffic corresponding thereto as a second category of MAC address. In response to the number of the MAC addresses designated as the second category of MAC address exceeding a prescribed threshold value, an operation is performed for causing a timeout value of at least a portion of the MAC addresses designated as the second category of MAC address to be less than a timeout value of the MAC addresses designated as the first category of MAC address.

In another embodiment of the present invention, an Ethernet switch comprises a MAC table, a flood determining mechanism, and a timeout value adjustment mechanism. The MAC table has a plurality of MAC address entries therein. Each one of the entries designates a respective MAC address, a respective MAC address category and a respective timeout value. The respective MAC address category is one of a MAC address category corresponding to one-way traffic and a MAC address category corresponding to two-way traffic. The flood determining mechanism is configured for determining when an increase in the number of MAC address entries designating the one-way traffic MAC address category exceeds a prescribed threshold. The timeout value adjustment mechanism is configured for adjusting the timeout values dependent upon MAC address category. Such adjusting includes causing the timeout value of at least a portion the MAC address entries designating the one-way traffic MAC address category to be less than a default timeout value.

In another embodiment of the present invention, a data storage device has a set of processor-executable instructions stored thereon. The set of processor-executable instructions comprises various instructions configured for defending against MAC table overflow attacks. To this end, instructions are provided for populating a MAC table with a plurality of MAC address entries therein. Each one of the entries designates a respective MAC address, a respective MAC address category and a respective timeout value and wherein the respective MAC address category is one of a MAC address category corresponding to one-way traffic and a MAC address category corresponding to two-way traffic. Instructions are provided for determining when an increase in the number of MAC address entries designating the one-way traffic MAC address category exceeds a prescribed threshold. Instructions are provided for adjusting at least a portion of the timeout values dependent upon MAC address category in response to the number of the MAC address entries designating the one-way traffic MAC address category exceeding a prescribed threshold.

As such, a skilled person will appreciate that embodiments of the present invention facilitate defending against MAC table overflow attacks in a manner that) offers a number of advantages relative to prior approaches for defending against MAC table overflow attacks. One advantage is that such embodiments defend against MAC table overflow attacks in a manner that is lightweight, easy and simple whereby no complicated computation is required and whereby the switch still works like a traditional bridge. Another advantage is that such embodiments defend against MAC table overflow attacks in a manner that is flexible and scalable whereby no MAC addresses or number of MAC addresses have to be configured and whereby, when new users are added, no configuration changes are required on the switch. Still another advantage is that such embodiments defend against MAC table overflow attacks in a manner that is resilient whereby, when an attack happens, the switch still allows legitimate user traffic from/to other ports or even the port on which the attack originates, which is especially important and useful for VPLS (e.g., emulated local area network (E-LAN) service from service providers). Yet another advantage is that such embodiments defend against MAC table overflow attacks in a manner whereby, unlike MACSec, no large-scale changes to existing switches and/or end user equipment must be made.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
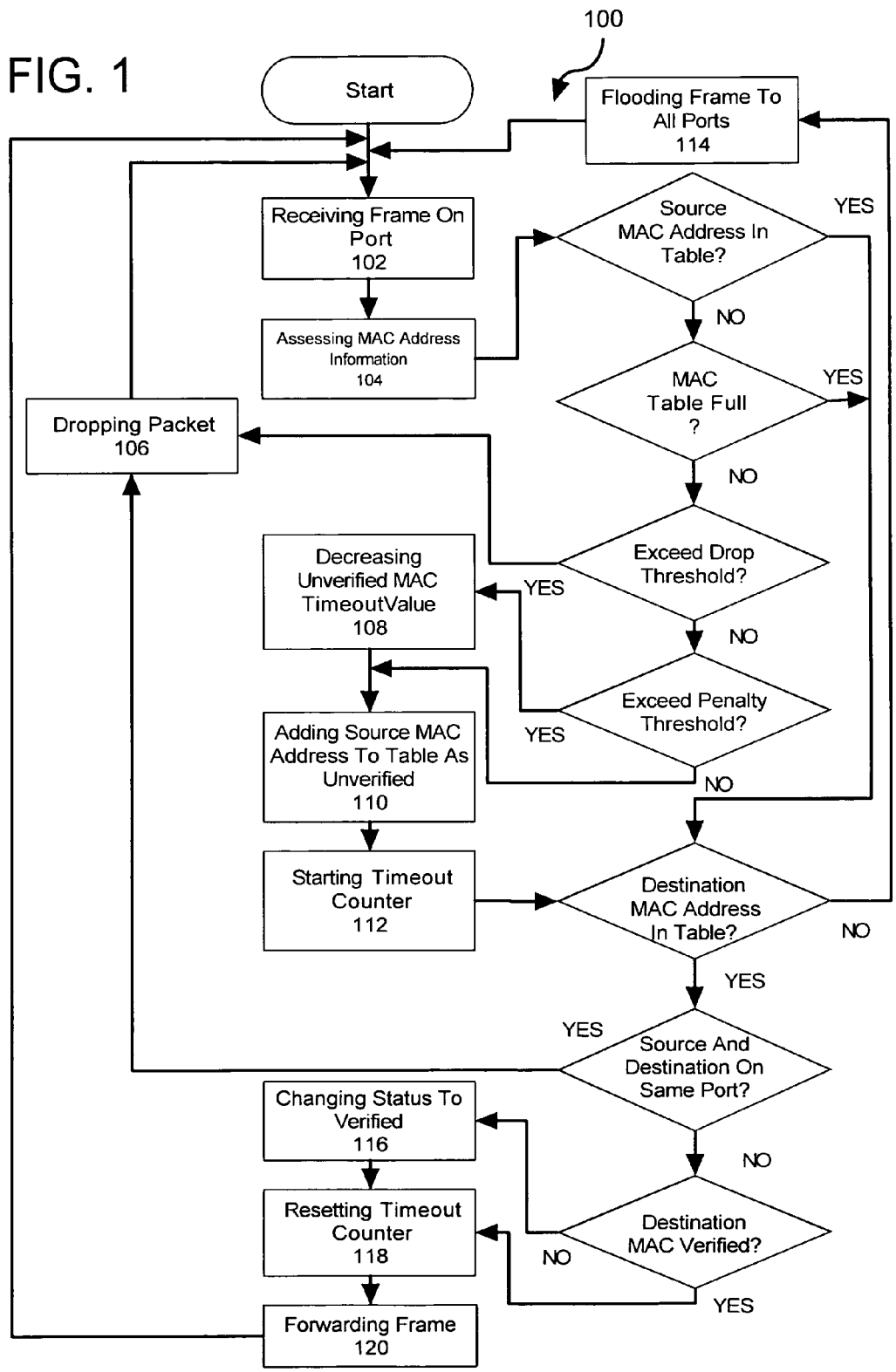
FIG. 1 shows a method for defending against MAC table overflow attacks in accordance with an embodiment of the present invention.

Typically legitimate traffic is two-way, so a MAC address can be seen by a switch as both source and destination in a reasonable time window. On the contrary, typically MAC table overflow attack is one-way. Frames with spoofed MAC addresses as source are sent with an intention to overflow the MAC table and the switch will not see any response traffic to those spoofed addresses. It is these one-way and two-way traffic considerations that embodiments of the present invention use for defending against MAC table overflow attacks.

Turning now to specific discussion of embodiments of the present invention, a MAC address on a switch is referred to a being "verified" (i.e., a verified MAC address) when it has been seen as both source and destination addresses. If a MAC address is only seen as source address, and not yet seen as a destination address, it is referred as being "unverified" (i.e., an unverified MAC address). In this manner, a machine communicating verified MAC addresses is a verified machine and a machine communicating unverified MAC addresses is an unverified machine.

Initially (e.g., upon initialization of a system in accordance with the present invention), default timeout values are assigned to both verified and unverified MAC addresses. In some implementations of the present invention, the verified and unverified MAC addresses are assigned a common default timeout value because, in real-world situations, a small percentage of traffic exhibits asymmetry with respect to source and destination addresses. In other implementations of the present invention, the verified and unverified MAC addresses are assigned respective default timeout values that are effectively different (e.g., by a relatively small amount) or substantially different (e.g., by a relatively large amount). Thus, if no MAC table overflow attack happens, the switch works exactly or essentially like a traditional (i.e., prior art) switch.

When MAC flooding happens (i.e., a MAC table overflow attack), the switch will see a significant increase of unverified MAC addresses for a specific port. When the number grows to a configurable penalty-threshold 1, the timeout value of unverified address for that specific port is decreased by a first configurable amount (e.g., percentage, increment, etc) such that the spoofed MAC address(es) age out fast and unknown legitimate MAC address(es) can still be learned. If the number of unverified MAC addresses for the same specific port continues to grow and exceed the second penalty-threshold 2, the timeout value of unverified address for that specific port is decreased again by a second configurable amount such that unverified MAC address(es) timeout even faster. Conversely, if the MAC table overflow attack stops or goes milder to a point where the number of unverified MAC addresses decreases to below either penalty-threshold, the timeout value for the unverified MAC addresses learned on that specific port will be restored to the value used before the most current penalty-threshold was exceeded. Thus, in this implementation, the timeout value is adjusted on a per-port basis). Alternatively, in a simplified implementation of the present invention, the total number of unverified MAC addresses for all ports can be monitored and the timeout value for the unverified MAC addresses can be adjusted on a system-wide basis as opposed to a per-port basis. It is disclosed herein that the number of penalty-thresholds and theirs values can be configurable based on a various system parameters (e.g., the size of MAC table of the switch).

If the MAC table overflow attack become uncontrolled such that the number of unverified MAC addresses received on the port continues growing to a configurable drop threshold, the switch will then drop the traffic from unknown MAC addresses from the port in an effort to disable the attack. However, traffic from verified (i.e., known MAC addresses) will be handled normally. In this manner, the switch operates like a traditional switch with added intelligence of keeping track of the status of each MAC address and adjusting the timeout value or dropping traffic based on the number of unverified MAC addresses.

FIG. 1 shows a data flow method 100 for defending against MAC table overflow attacks in accordance with an embodiment of the present invention. An operation 102 is performed for receiving a frame on a port of the Ethernet switch. In response to receiving the frame, an operation 104 is performed for assessing MAC information associated with the contents of the frame. If a source MAC address of the frame is not in an MAC table of the switch, the MAC table is not full and the drop threshold has been exceeded, an operation 106 is performed for dropping the packet. If a source MAC address of the frame is not in an MAC table, the MAC table is not full, the drop threshold has not been exceeded, and a penalty threshold has been exceeded, an operation 108 is performed for decreasing a timeout value of the MAC address (i.e., an unverified MAC address), followed by an operation 110 being performed for adding the source MAC address to the MAC table as unverified and an operation 112 being performed for starting the timeout counter for the MAC entry. Otherwise, if the source MAC address of the frame is in the MAC table or the source MAC address of the frame is not in the MAC table but the MAC table is full, an operation 114 is performed for flooding the frame to all ports of the switch when the destination MAC address for the frame is not in the MAC table. In the case where the MAC address of the frame is not in the MAC table, the MAC table is not full, the drop threshold has not been exceeded and a penalty threshold has not been exceeded, the method continues at the operation 110 for adding the source MAC address to the MAC table.

In the case where the source MAC address of the frame is in the MAC table or the source MAC address of the frame is not in the MAC table but the MAC table is full, an operation 116 is performed for changing a status of the destination MAC address from unverified to verified when the destination MAC address is in the MAC table, the source and destination MAC addresses are not on a common port and the destination MAC address is not verified. Thereafter, an operation 118 is performed for resetting a timeout counter for the port and an operation 120 is performed for forwarding the frame to the destination MAC address. If the destination MAC address is verified, the operation of 116 for changing the status of the MAC address from unverified to verified is omitted and the method continues at the operation 1 18 for resetting a timeout counter. If the source and destination MAC addresses are on a common port, the method continues at the operation 106 for dropping the packets.

Referring back to the operation 112 for starting the timer in conjunction with performing the operation 110 for adding the source MAC address to the MAC table as unverified, thereafter, the method continues at the operation 116 for changing a status of the MAC address from unverified to verified when the destination MAC address is in the MAC table, the source and destination MAC addresses are not on a common port and the destination MAC address is not verified. If the destination MAC address is verified, the operation of 116 for changing the status of the MAC address from unverified to verified is omitted and the method continues at the operation 118 for resetting a timeout counter. If the source and destination MAC addresses are on a common port, the method continues at the operation 106 for dropping the packets.

EXAMPLE

System Configured for Defending Against MAC Table Overflow Attacks

A network includes three host machines with MAC address MAC1, MAC2 and MAC3 connect, respectively, to port p1, p2 and p3 of a switch (i.e., Switch). The three host machines are referred to as MAC1, MAC2 and MAC3, respectively. A hub (i.e., HUB) is connected between MAC1 and the switch. The switch boots up and the MAC table of the switch is cleared.

Figure 2:
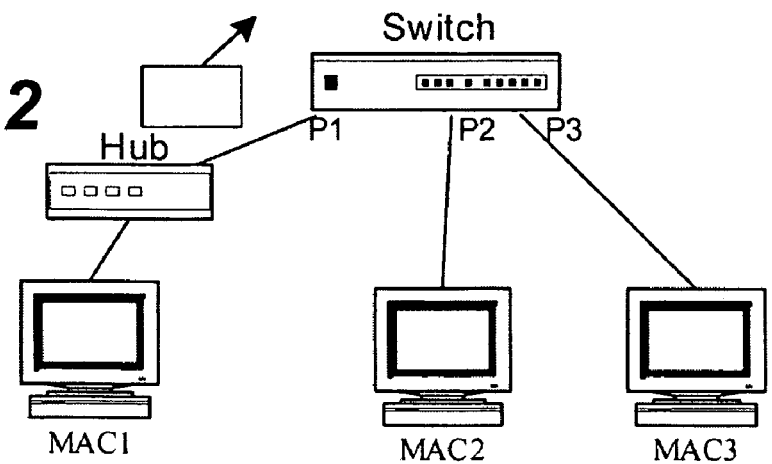
FIGS. 2-7 show various populated states of a MAC table in accordance with an embodiment of the present invention.

Referring to FIG. 2 and Table 1 (i.e., the switch MAC table), MAC1 sends a frame to MAC2, and it is received by the switch on port p1. The switch checks its MAC table and does not find MAC1, so it creates an entry in the MAC table for the source MAC address of MAC1 to associate MAC1 with port p1 and sets the status of the MAC address of MAC1 as being unverified. The timeout counter for this MAC table entry is then started. The switch allows a user (e.g., system administrator) to specify default timeout values for both unverified and verified MAC addresses. In this example, the timeout values for both verified and unverified MAC addresses are. set at 300 seconds.

TABLE 1

| Switch MAC Table (first state) | | | |
|---|---|---|---|
| MAC Address | Port # | Status | Timeout Value |
| MAC1 | P1 | Unverified | 300 s |

Figure 3:
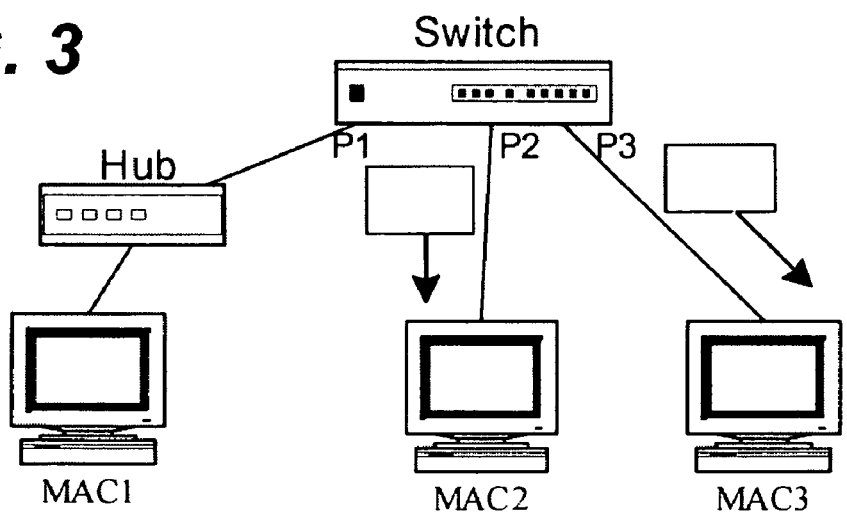

Next, the destination MAC address for MAC1 is checked against the MAC table. Because MAC2 is not found (i.e., no entry for MAC2 in the MAC table), the switch floods the frame to all of its ports, as shown in FIG. 3.

Figure 4:
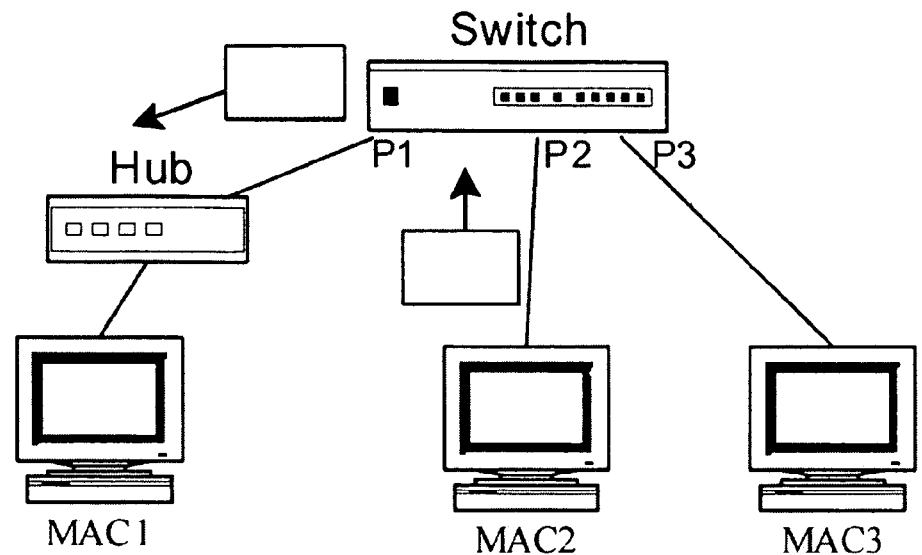

Accordingly, both MAC2 and MAC3 will receive this frame. MAC3 discards this frame because the destination is not the address of MAC3. After MAC2 receives this frame, it responds to MAC1. In this manner, a frame with MAC2 as source and MAC1 as destination is seen by the switch on port P2. Referring to FIG. 4 and Table 2, the switch checks the source address of MAC2, but doesn't find it in the MAC table, so the switch creates an entry to associate port P2 with MAC2, sets the status of this source address as unverified (i.e., because the MAC address of MAC2 has only one-way traffic associated therewith), and then starts the timeout counter for this MAC table entry.

Thereafter, the destination MAC address is checked. Now, MAC1 is found in the MAC table and is determined to have a status as being unverified. Accordingly, because MAC addresses of MAC1 support two-way traffic, the switch changes the status of MAC1 to verified, resets the timeout counter for MAC1, and then forwards the frame to MAC1.

Please note the table for demonstration purposes does not take into consideration the time elapsed since MAC1 and MAC2 addresses were populated and therefore do not have the realistic values for "Timeout remaining"

TABLE 2

Switch MAC Table (second state)

| MAC Address | Port # | Status | Timeout Value |
|---|---|---|---|
| MAC1 | P1 | Verified | 300 s |
| MAC2 | P2 | Unverified | 300 s |

Figure 5:
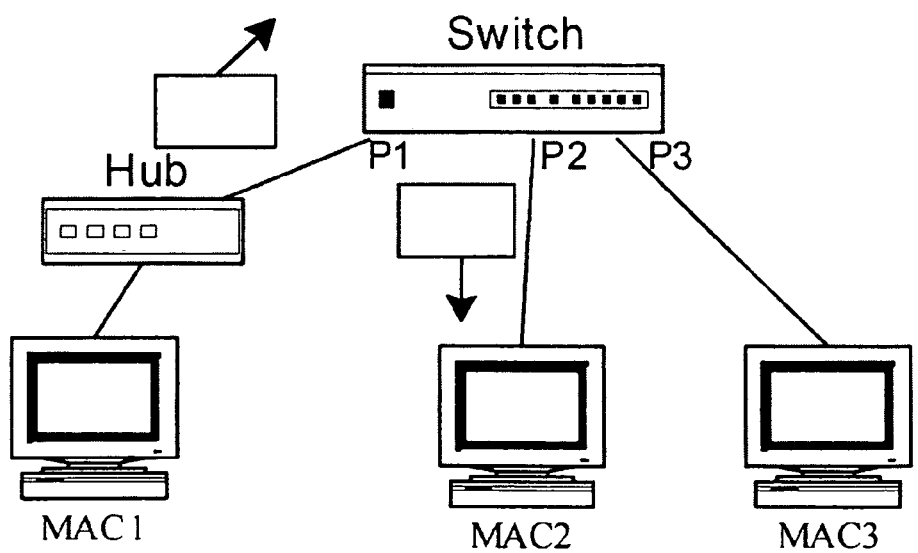

Referring to FIG. 5 and Table 3, if MAC1 send another frame to MAC2, the switch will update the status of MAC2 status to verified, reset the timeout counter for MAC2, and send the frame to P2 directly, without flooding to all ports.

TABLE 3

Switch MAC Table (third state)

| MAC Address | Port # | Status | Timeout Value |
|---|---|---|---|
| MAC1 | P1 | Verified | 300 s |
| MAC2 | P2 | Verified | 300 s |

Figure 6:
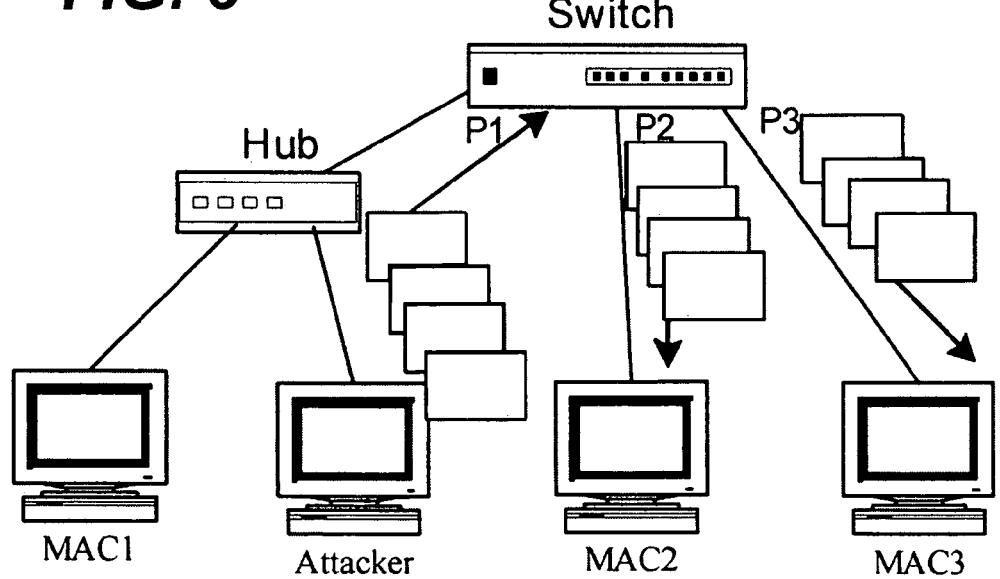

Referring to FIG. 6 and Table 4, if an attacker connects to the hub, which is connected to port P1 of the switch, and sends frames with a large number of invalid source MAC addresses (e.g., MAC-a, MAC-b, etc) to the switch, the switch will create entries to associate these invalid MAC addresses with port P1 and set their status as unverified because they are spoofed and no return traffic is seen. At this point, the switch has no idea if the traffic from an unverified MAC is legitimate or not, so the default timeout is still used for the invalid MAC addresses. Typically, attacking traffic will also use spoofed destination MAC addresses, which cannot be found in the MAC table, so the traffic is flooded to all ports by the switch.

TABLE 4

Switch MAC Table (fourth state)

| MAC Address | Port # | Status | Timeout Value |
|---|---|---|---|
| MAC1 | P1 | Verified | 300 s |
| MAC2 | P2 | Verified | 300 s |
| MAC-a | P1 | Unverified | 300 s |
| MAC-b | P1 | Unverified | 300 s |

Referring to Table 5, with the attack still continuing, a large number of unverified MAC addresses will be added to the MAC table. When this number reaches a first configurable threshold (e.g., penalty-threshold 1), for example 20% of MAC table space is taken by unverified MAC addresses learned on one port, it is likely that the switch is under attack, so the switch will decrease the timeout value of unverified MAC address learned on P1 by 50% (i.e., a configurable value). Now, all the newly learned unverified MAC address from P1 will have a timeout value of 150 s, so that they can age out quickly to make room for legitimate MAC addresses. When the number of unverified MAC addresses keeps growing to a second configurable threshold (e.g., penalty-threshold 2), the timeout value is decreased by another 50% to make the corresponding unverified MAC address timeout even faster. If the attack stops or goes milder, the number of unverified MAC addresses should decrease because older invalid unverified MAC addresses will age out. When the number is lower than either penalty-threshold, the timeout value for unverified MAC learned on that port will be restored to the value used before that penalty-threshold was exceeded. The number of penalty-thresholds and their values are configurable, and they should be based on the size of MAC tables.

TABLE 5

Switch MAC Table (fifth state)

| MAC Address | Port # | Status | Timeout Value |
|---|---|---|---|
| MAC1 | P1 | Verified | 300 s |
| MAC2 | P2 | Verified | 300 s |
| MAC-a | P1 | Unverified | 300 s |
| MAC-b | P1 | Unverified | 300 s |
| ... | ... | ... | ... |
| MAC-1 | P1 | Unverified | 150 s |
| MAC-m | P1 | Unverified | 150 s |
| ... | ... | ... | ... |
| MAC-x | P1 | Unverified | 75 s |
| MAC-y | P1 | Unverified | 75 s |
| ... | ... | ... | ... |

Figure 7:
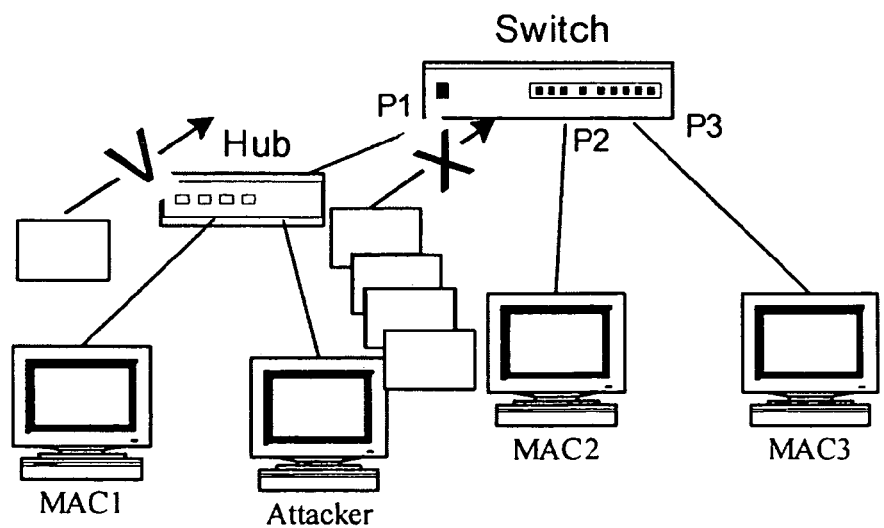

Referring to FIG. 7, if the attack goes wild, eventually a high percentage (e.g., a drop-threshold) of MAC table will be filled by unverified MAC addresses (i.e., designated as X) learned on P1. The switch will be quite sure that attack is under way, so it can drop all the traffic from unknown addresses receive on port P1 to disable the attack. But traffic from known MAC addresses, MAC1 in this example, is still allowed to enable legitimate user communication (e.g., verified MAC addresses designated as V).

Referring now to instructions processible by a data processing device, it will be understood from the disclosures made herein that methods, processes and/or operations adapted for carrying out MAC table overflow attack defending functionality as disclosed herein are tangibly embodied by computer readable medium having instructions thereon that are configured for carrying out such functionality. In one specific embodiment, the instructions are tangibly embodied for carrying out the method 100 disclosed above, the example presented herein, both or a combination of portions from both. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out MAC table overflow attack defending functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An Ethernet switch, comprising:
   at least one data processing device;
   instructions processable by said at least one data processing device; and
   an apparatus from which said instructions are accessible by said at least one data processing device;
   wherein said instructions are configured for enabling said at least one data processing device to facilitate:
      a MAC table being populated to have a plurality of MAC address entries therein, wherein each one of said entries designates a respective MAC address, a respective MAC address category and a respective timeout value and wherein the respective MAC address category is one of a MAC address category corresponding to one-way traffic and a MAC address category corresponding to two-way traffic;
      a flood determining mechanism determining when an increase in the number of MAC address entries designating said one-way traffic MAC address category exceeds a prescribed threshold value; and
      a timeout value adjustment mechanism adjusting said timeout values dependent upon MAC address category, wherein said adjusting includes causing the timeout value of at least a portion said MAC address entries designating said one-way traffic MAC address category to be less than a default timeout value;
   wherein the flood determining mechanism is configured for determining when:
      an increase in the number of said MAC address entries designating said one-way traffic MAC address category exceeds a first prescribed penalty threshold value;
      an increase in the number of said MAC address entries designating said one-way traffic MAC address category exceeds a second prescribed penalty threshold value; and
      an increase in the number of said MAC address entries designating said one-way traffic MAC address category exceeds a prescribed drop threshold value; and
   the timeout value adjustment mechanism is configured for:
      setting the timeout value in said MAC address entries designating said one-way traffic MAC address category at a first reduced value relative to the default timeout value in response to the number of said MAC address entries designating said one-way traffic MAC address category exceeding the first prescribed penalty threshold value;
      setting the timeout value in said MAC address entries designating said one-way traffic MAC address category at a second reduced value relative to said default timeout value in response to the number of said MAC address entries designating said one-way traffic MAC address category exceeding the second prescribed penalty threshold value; and
      dropping traffic associated with at least a portion of said MAC address entries designating said one-way traffic MAC address category in response to the number of said MAC address entries designating said one-way traffic MAC address category exceeding the prescribed drop threshold value.

2. The switch of claim 1 wherein said determining and said adjusting are performed on a per-port basis.

3. The switch of claim 1 wherein:
   the flood determining mechanism is configured for determining when the number of said MAC address entries designating said one-way traffic MAC address category drops below a threshold value corresponding to a currently reduced timeout value; and
   the timeout value adjustment mechanism is configured for setting the timeout value of said MAC address entries designating said one-way traffic MAC address category to a less reduced timeout value than the currently reduced timeout value in response to the number of said MAC address entries designating said one-way traffic MAC address category retreating from a threshold value corresponding to the currently reduced timeout value.

4. The switch of claim 1 wherein said determining and said adjusting are performed on a per-port basis.

5. A data storage device having a set of processor-executable instructions stored thereon, the set of processor-executable instructions comprising:
   instructions for populating a MAC table with a plurality of MAC address entries therein, wherein each one of said entries designates a respective MAC address, a respective MAC address category and a respective timeout value and wherein the respective MAC address category is one of a MAC address category corresponding to one-way traffic and a MAC address category corresponding to two-way traffic;
   instructions for determining when an increase in the number of MAC address entries designating said one-way traffic MAC address category exceeds a first prescribed penalty threshold value;
   instructions for determining when an increase in the number of said MAC address entries designating said one-way traffic MAC address category exceeds a second prescribed penalty threshold value;
   instructions for determining when an increase in the number of said MAC address entries designating said one-way traffic MAC address category exceeds a prescribed drop threshold value;
   instructions for adjusting at least a portion of said timeout values dependent upon MAC address category in response to the number of said MAC address entries designating said one-way traffic MAC address category exceeding a prescribed threshold value;
   instructions for setting the timeout value in said MAC address entries designating said one-way traffic MAC address category at a first reduced value relative to the default timeout value in response to the number of said MAC address entries designating said one-way traffic MAC address category exceeding the first prescribed penalty threshold value;

instructions for setting the timeout value in said MAC address entries designating said one-way traffic MAC address category at a second reduced value relative to said default timeout value in response to the number of said MAC address entries designating said one-way traffic MAC address category exceeding the second prescribed penalty threshold value; and instructions for dropping traffic associated with at least a portion of said MAC address entries designating said one-way traffic MAC address category in response to the number of said MAC address entries designating said one-way traffic MAC address category exceeding the prescribed drop threshold value.

6. The device of claim 5 wherein said determining and said adjusting are performed on a per-port basis.

7. The device of claim 5 wherein said populating includes setting the respective timeout value of all of said MAC address entries at a common default timeout value.

8. The device of claim 7 wherein:
said adjusting includes setting the timeout value of MAC address entries designating said one-way traffic MAC address category at a reduced value relative to said default timeout value in response to the number of MAC address entries designating said one-way traffic MAC address category exceeding a respective prescribed penalty threshold value.

9. A method, comprising:
at least one data processing device accessing, from memory coupled to said at least one data processing device, instructions causing said at least one data processing device to perform an operation for populating a MAC table with a plurality of MAC address entries therein, wherein each one of said entries designates a respective MAC address, a respective MAC address category and a respective timeout value and wherein the respective MAC address category is one of a MAC address category corresponding to one-way traffic and a MAC address category corresponding to two-way traffic;

said at least one data processing device accessing, from said memory, instructions causing said at least one data processing device to perform an operation for determining when an increase in the number of said MAC address entries designating said one-way traffic MAC address category exceeds a first prescribed penalty threshold value;

said at least one data processing device accessing, from said memory, instructions causing said at least one data processing device to perform an operation for determining when an increase in the number of said MAC address entries designating said one-way traffic MAC address category exceeds a second prescribed penalty threshold value;

said at least one data processing device accessing, from said memory, instructions causing said at least one data processing device to perform an operation for determining when an increase in the number of said MAC address entries designating said one-way traffic MAC address category exceeds a prescribed drop threshold value;

instructions for adjusting at least a portion of said timeout values dependent upon MAC address category in response to the number of said MAC address entries designating said one-way traffic MAC address category exceeding a prescribed threshold value;

said at least one data processing device accessing, from said memory, instructions causing said at least one data processing device to perform an operation for setting the timeout value in said MAC address entries designating said one-way traffic MAC address category at a first reduced value relative to the default timeout value in response to the number of said MAC address entries designating said one-way traffic MAC address category exceeding the first prescribed penalty threshold value;

said at least one data processing device accessing, from said memory, instructions causing said at least one data processing device to perform an operation for setting the timeout value in said MAC address entries designating said one-way traffic MAC address category at a second reduced value relative to said default timeout value in response to the number of said MAC address entries designating said one-way traffic MAC address category exceeding the second prescribed penalty threshold value; and said at least one data processing device accessing, from said memory, instructions causing said at least one data processing device to perform an operation for dropping traffic associated with at least a portion of said MAC address entries designating said one-way traffic MAC address category in response to the number of said MAC address entries designating said one-way traffic MAC address category exceeding the prescribed drop threshold value.

10. The method of claim 9 wherein said determining and said adjusting are performed on a per-port basis.

11. The method of claim 9 wherein said populating includes setting the respective timeout value of all of said MAC address entries at a common default timeout value.

12. The method of claim 11 wherein:
said adjusting includes setting the timeout value of MAC address entries designating said one-way traffic MAC address category at a reduced value relative to said default timeout value in response to the number of MAC address entries designating said one-way traffic MAC address category exceeding a respective prescribed penalty threshold value.

* * * * *